Dec. 5, 1967  HITOSHI KONDO  3,356,208
CIGARETTE CASE HAVING A MIRROR THEREON
Filed April 13, 1965
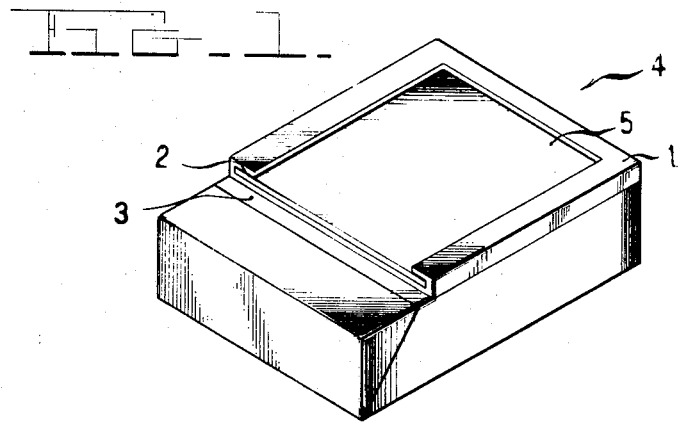
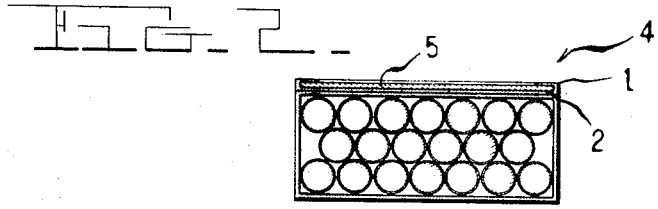
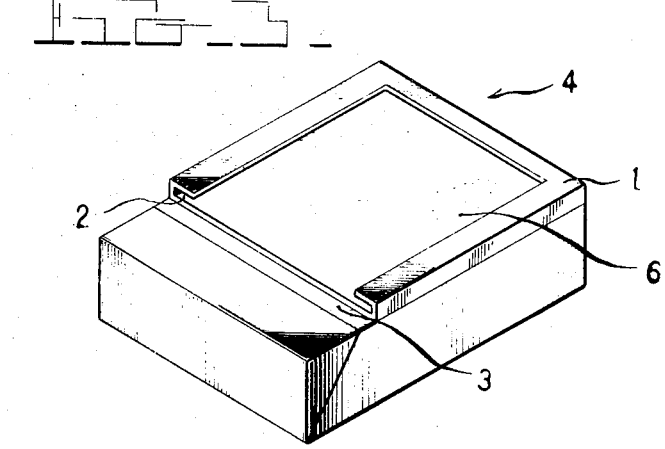
HITOSHI KONDO
INVENTOR
BY *Wenderoth, Lind*
*and Ponack*
ATTORNEYS

3,356,208
CIGARETTE CASE HAVING A MIRROR THEREON
Hitoshi Kondo, 441-3 Oaza, Kyu-Ikeda-Shimo,
Neyagawa, Osaka, Japan
Filed Apr. 13, 1965, Ser. No. 447,650
1 Claim. (Cl. 206—38)

ABSTRACT OF THE DISCLOSURE

A cigarette case having a three sided open ended rectangular frame mounted on three edges of a flat rectangular outer surface of said case, said frame having inwardly facing groove therein, and a thin rectangular mirror having three edges slidably mounted in said grooves so as to cover said outer surface and be slidable out of said frame, said outer surface having an advertisement thereon, whereby when said mirror is slid out of said frame the advertisement is exposed.

---

This invention relates to a cigarette case having a thin mirror on the outer surface thereof.

More particularly, the present invention relates to a cigarette case wherein a thin mirror is removably mounted on the outer surface thereof by three edges of said thin mirror being retained in the corresponding grooves formed in a frame mounted on three edges of said outer surface, respectively, whereby an advertisement printed on said outer surface will be covered by said mirror when it is in said frame and will be disclosed when the mirror is removed from the frame.

This invention will be further described, reference being had to the accompanying drawings, in which:

FIG. 1 is a perspective view of a cigarette case;

FIG. 2 is a cross sectional view of the cigarette case of FIG. 1; and

FIG. 3 is a perspective view of the cigarette case after the thin mirror has been removed.

Referring to FIGS. 1 and 2, a three sided, open ended rectangular frame 1 with inwardly facing grooves 2 is mounted on three edges of a flat outer surface 3 of cigarette case 4 and a thin rectangular mirror 5 is positioned in the frame 1 with three edges slidably positioned in the corresponding grooves 2. Further, an advertisement 6 is formed on the outer surface 3 surrounded by said frame 1 so as to be covered by said mirror 3.

Usually said advertisement 6 is covered by said thin mirror 5, but may be disclosed occasionally, e.g. when said mirror is removed from the frame 1.

When using said case 4 it is extremely convenient for the user to see his reflection in said mirror 5, and the advertisement 6 is usually kept hidden by said mirror 5.

When said mirror is removed from the outer surface 3, however, said advertisement 6 is suddenly disclosed to astonish the user, thereby greatly increasing the efficacy of the advertisement.

Further, said mirror 5 is thin and light so that it is not inconvenient to carry it.

The thin mirror is easy to install on the outer surface 3 so as to cover said advertisement 6 by inserting two opposite edges thereof into the corresponding grooves 2 of the frame 1, and it is likewise easy to remove by sliding it out of said grooves.

What is claimed is:

A cigarette case having a three sided open ended rectangular frame mounted on three edges of a flat rectangular outer surface of said case, said frame having inwardly facing grooves therein, and a thin rectangular mirror having three edges slidably mounted in said grooves so as to cover said outer surface and be slidable out of said frame, said outer surface having an advertisement thereon, whereby when said mirror is slid out of said frame the advertisement is exposed.

References Cited

UNITED STATES PATENTS

| | | | |
|---|---|---|---|
| 971,892 | 10/1910 | Hudson | 206—38 |
| 1,398,583 | 11/1921 | Bovee. | |
| 1,450,963 | 4/1923 | Szastalo | 206—33 |
| 1,698,266 | 1/1929 | Kirby | 132—83.5 |
| 1,876,407 | 9/1932 | Frazier | 88—100 |
| 2,284,174 | 5/1942 | Spicer | 206—38 |
| 2,551,138 | 5/1951 | Kirkland | 206—37 |

FOREIGN PATENTS 257,606  4/1949  Switzerland.

THERON E. CONDON, *Primary Examiner.*

MARTHA L. RICE, *Examiner.*